United States Patent
Hwang et al.

(10) Patent No.: US 7,047,473 B2
(45) Date of Patent: May 16, 2006

(54) METHOD FOR CONTROLLING DATA TRANSMISSION IN A RADIO COMMUNICATIONS SYSTEM

(75) Inventors: Seung Hoon Hwang, Seoul (KR); Hyuck Chan Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 645 days.

(21) Appl. No.: 10/142,952

(22) Filed: May 13, 2002

(65) Prior Publication Data
US 2002/0168945 A1 Nov. 14, 2002

(30) Foreign Application Priority Data
May 14, 2001 (KR) .............................. 2001/26062
May 21, 2001 (KR) .............................. 2001/27774

(51) Int. Cl.
G08C 25/02 (2006.01)
H04L 1/18 (2006.01)

(52) U.S. Cl. ...................... 714/751; 714/748

(58) Field of Classification Search ................ 714/748, 714/751; G08C 25/02; H04L 1/18
See application file for complete search history.

(56) References Cited

U.S. PATENT DOCUMENTS 6,654,922 B1 * 11/2003 Numminen et al. ........ 714/748
6,697,987 B1 * 2/2004 Lee et al. ................... 714/751
2003/0018794 A1 * 1/2003 Zhang et al. ............... 709/231
2003/0023918 A1 * 1/2003 Wu ............................ 714/751

FOREIGN PATENT DOCUMENTS

EP 1469688 A1 * 10/2004

OTHER PUBLICATIONS

Yao, Yu-Dong; Performance of ARQ and NAK-based ARQ on a correlated fading channel; Sep. 19-22, 1999; Vehicular Technology Conference, 1999. VTC 1999—Fall IEEE VTS 50th, vol.: 5; pp. 2706-2710.*

* cited by examiner

Primary Examiner—R. Stephen Dildine
(74) Attorney, Agent, or Firm—Fleshner & Kim LLP

(57) ABSTRACT

A method for controlling the transmission of data in a radio communications system transmits response signals from a receiver which includes information that reflects received signal quality, as well as information indicating whether an error has occurred in the data transmission. In one case, acknowledgment signals or negative acknowledgment signals may be regarded as no reply and not forwarded to a transmitter. In another case, the signals could be recognized as an acknowledgment or retransmission request by a receiver. Preferably, the signals transmitted from the receiver to the transmitter are composed of more than 2-bit multiplexed information. By transmitting response signals of this type, the transmission efficiency of packet data may be increased, and the automatic repeat request (ARQ) performance by the system may be greatly improved.

41 Claims, 5 Drawing Sheets

|  |  | +1 | −1 | X(No reply) |
|---|---|---|---|---|
| Prior art |  | ACK | NAK |  |
| Present invention | NAK only system | NAK with control | NAK | ACK |
|  | ACK only system | NAK with control | ACK | NAK |

METHOD FOR CONTROLLING DATA TRANSMISSION IN A RADIO COMMUNICATIONS SYSTEM

BACKGROUND OF THE INVENTION

1. Field of the Invention

The present invention generally relates to a method for controlling data transmission in a radio communication system. In particular, the present invention relates to a method for controlling data transmission using response signals including additional control information that reflects received signal quality as well as response signals indicating whether the data transmission is made.

2. Background of the Related Art

Universal Mobile Telecommunications System (UMTS) is a third-generation mobile communication system that is more advanced than Global System for Mobile communications (GSM), which is the second-generation mobile communication system in Europe. A primary goal of this third-generation system is to provide users with multimedia mobile communication services based on GSM-core network and Wideband Code Division Multiple Access (WCDMA) air interface technology.

To standardize the IJMTS worldwide, the federation of nations or national standard establishment organizations like ETSJ of Europe, ARIB/TTC of Japan, TI of the United States, and TTA of Korea gathered together in December, 1998, and organized the Third Generation Partnership Project (hereinafter, it is abbreviated to 3GPP). Through this 3GPP, a more detailed specification for the UMTS as an IMT-2000 system has been regulated.

FIG. 1 illustrates a configuration of a standard interface protocol over a 3GPP wireless access network for interfacing a terminal and a network wirelessly in the air. Referring to FIG. 1, horizontally, the wireless access interface protocol is divided into a physical layer (PHY), a data link layer and a network layer. Vertically, the protocol includes a control plane for signaling and a user plane for transmitting data information. The user plane is a region where user traffic information like voice or IP packet transmission is transferred, and the control plane is a region where control information including an interface of the network or call maintenance and management is transferred.

The protocol layers in FIG. 1 can be divided into a first layer L1, a second layer L2, and a third layer L3, on the basis of 3 lower layers of the widely known 7-layer open systems interconnection (OSI) standard model in communication systems.

The first layer L1 acts as a physical layer (PHY) for the radio interface, and is connected to the medium access control (hereinafter, it is abbreviated to MAC) on the upper layer through transport channels. The first layer L1 primarily sends the data that was transmitted to the PHY through the transport channel to a receiving side using a variety of coding and modulation methods appropriate for the radio environment.

The second layer L2 acts as a data link layer, and lets many terminals share radio resources over the WCDMA network. The second layer L2 is divided into a MAC layer, a radio link control (hereinafter, it is abbreviated to RLC) layer, a packet data convergence protocol (hereinafter, it is abbreviated to PDCP) layer, and a broadcast/multicast control (hereinafter, it is abbreviated to BMC) layer.

The MAC layer transfers data using an appropriate mapping relation between logical channels and transport channels. Here, the logical channels are the ones connecting the upper layers to the MAC layers. Normally, a number of diverse logical channels are provided depending on the kinds of information to be transmitted.

The RLC layer constitutes an appropriate RLC protocol data unit (PDU) for transmission, matching with segmentation and concatenation of RLC service data unit (SDU) transported from upper layers, and conducts an automatic repeat request (ARQ) in charge of retransporting any lost RLC PDU.

The PDCP layer is disposed at an upper portion of the RLC layer, and makes the data that is transported through network protocols like IPv4 or IPv6 appropriate to be transported in the RLC layer.

The BMC layer transports the message that is transferred from a Cell Broadcast Center (CBS) through a radio interface. The primary function of the BMC is to schedule the cell broadcast message transported to terminals, and to transport the scheduled message. Most of time, the BMC layer transports the data through the RLC layer which operates in the no reply mode.

The RRC layer, which is the bottom layer of the third layer L3, is only defined on the control plane, and is in charge of controlling transport channels and physical channels associated with the setup, reset, and release of radio bearers.

The aforementioned WCDMA system targets 2 Mbps of transmission speed at the indoor and pico-cell environment, and 384 kbps in a general radio environment. However, as wireless internet is being widely used and the number of subscribers increase, more diverse services have been introduced to meet user needs, and in order to meet these needs transmission speed must be increased.

Consequently, the 3GPP is currently concentrating on a study for providing high transmission speeds by evolving (or developing) the WCDMA network. One representative system is known as the High Speed Downlink Packet Access (hereinafter, it is abbreviated to HSDPA). The WCDMA-based HSDPA system supports a maximum 10 Mbps for the downlink, and is expected to be able to shorten delay time and provide improved capacity. To provide improved transmission speed and capacity, the HSDPA system utilizes technologies like Link Adaptation (hereinafter, it is abbreviated to LA), Hybrid Automatic Repeat request (hereinafter, it is abbreviated to HARQ), Fast Cell Selection (hereinafter, it is abbreviated to FCS), or Multiple Input Multiple Output (hereinafter, it is abbreviated to MIMO) antenna.

The LA scheme uses a Modulation and Coding Scheme (hereinafter, it is abbreviated to MCS) that is suitable for channel status. More specifically, in case the channel status is good, an advanced modulation scheme like 16 QAM and 64 QAM is used, while if the channel status is not good, a low degree modulation scheme like QPSK is used.

The HARQ scheme, unlike the packet retransmission by the RLC layer, is a retransmission method with a totally new concept. It is linked to the physical layer and combines the retransmitted data with previously received data, thereby assuring a higher decoding success rate. According to this scheme, the untransported packets are not discarded but are stored, and they are decoded by combining with the retransmitted packet prior to the decoding step. Applying the LA, it becomes possible to increase the packet transmission speed to a great extent.

The FCS scheme is similar to soft handover techniques used in conventional systems. According to this scheme, although a terminal can receive data from a plurality of cells, only the data from a cell having the best channel status gets transmitted.

The MIMO antenna scheme makes it possible to increase the data transmission rate even in a channel environment which has a lot of scattering. This is accomplished by using a plurality of independent channels.

The HSDPA system tries to introduce a new technology while keeping its basis on the conventional WCDMA network as much as possible. However, slight modification is still needed to adapt new technologies. One example of this is found in a conventional base station (Node B) furnished with improved functions. More specifically, although the WCDMA network was mostly controlled by RNC, in the HSDPA system, the new technologies necessary for faster adaptation to different channel situations and for shortening delay time to the RNC are mostly controlled by the base station (Node B).

To this end, unlike the conventional WCDMA system, the base station (Node B) went through some modification to perform part of the MAC function, and the layer involved in this is called MAC-hs sublayer. The MAC-hs sublayer is disposed at an upper portion of the physical layer, and performs packet scheduling or carries out HARQ and LA functions. In addition, data transmission for the HSDPA system is performed using a transport channel called HS-DSCH (HSDPA Downlink Shared Channel), instead of a conventional transport channel. The HS-DSCH also has a short transmission time interval (TTI) (3 slot, 2 ms), which is different from the DSCH standard R'99/R'4 regulated by the WCDMA system, and supports diverse modulation code set (MCS) to obtain high data transmission rate.

For more reliable transmission, a hybrid ARQ (HARQ) developed from a combination of automatic repeat request (ARQ) with the channel coding was used. Through code division multiplexing (CDM), 4 users to the highest were supported at a time in this system.

As previously noted, for the HS-DSCH control information needs to be transmitted, and this information is usually transmitted through a shared control channel (HS-SCCH) introduced by the HSDPA standard. The control information transmitted through the HS-SCCH of the physical channel is divided into transport format and resource related information (TFRI), and HARQ related information. Particularly, the TFRI includes HS-DSCH transport channel set size, modulation method, coding rate, multicode number and so forth.

The HARQ related information includes block number and a redundancy version. Further, the UE identification (UE Id) can be transmitted to notify whom the information belongs. The UE Id related information, together with the TFRI and HARQ information, conducts a cyclic redundancy check (CRC) operation and transmits the CRC only. As for the HS-DSCH transmission, the 3GPP system supports a high-speed packet data service at a downlink.

In addition to the introduction of the packet data transmission described above, to get reliable data transmission, special technologies using error correction codes and requesting a retransmission by detecting errors have been developed. More specifically, the technology of using error correction codes utilizes redundancy bit called a self-correction code system, and detects/restores errors in the bit number within the redundancy bit. There are two ways to accomplish the error detection/correction: one is to use hamming code and the other is to transmit the same data more than twice to correct the errors, if they exist, after checking for any possible problems in the data. The technology of requesting a retransmission by detecting errors is called a retransmission feedback system. Again, there are two methods for the system: one is a simple information feedback and the other is an automatic repeat request (ARQ).

According to the information feedback method, information obtained from the receiving side is forwarded back to the transmitting side and the transmitting side checks if there is an error in the information. If there is, the information is retransmitted. According to the ARQ method, the receiving side examines whether there is an error in the transmitted data, and if there is, it notifies the presence of the error to the transmitting side, and the transmitting side retransmits the data with the error.

There are several kinds of ARQ methods, such as, Stop-and-Wait ARQ, continuous ARQ, and adaptive ARQ.

In the Stop-and Wait ARQ method, when the transmitting side transmits one data block to the receiving side, the receiving side first decides whether there is an error in the received block. If there is an error, the receiving side sends a retransmission request signal (hereinafter, it is referred to as negative acknowledgment, or NAK signal) to the transmitting side. If there is no error, the receiving side sends an acknowledgment signal (hereinafter, it is referred to as acknowledgment ACK signal) to the transmitting side. The transmitting side, on the other hand, transmits a next block upon receiving the ACK signal from the receiving side, and retransmits a corresponding block upon receiving the NAK signal or if there is no response until a certain amount of time lapses. Although the method seems to be easy and simple, its communication efficiency is not that good because every time the transmitting side transmits a block, it has to wait for a response from the receiving side no matter what.

The continuous ARQ method is further divided into Go-Back-N ARQ and Selective Repeat ARQ which are alternatives of the Stop-and-Wait ARQ. Here, the Go-Back-N ARQ method involves transmitting a plurality of data blocks, and especially when the NAK signal is sent from the receiving side, all blocks after the block that received the NAK signal are retransmitted. The selective repeat ARQ method involves retransmitting only the block that received the NAK signal.

The adaptive ARQ method makes it possible to change the length of the block dynamically to raise transmission efficiency. Here, the receiving side sends the error rate to the transmitting side, and allows the transmitting side adjust the length of the block before transmitting the block. In this manner, the adaptive ARQ has the best transmission efficiency. Actually, the ARQ method can be applied to the radio communication system as well.

Although many kinds of ARQ methods may be implemented in a radio communication system, basically the data receiving side should send an ACK or NAK signal to the transmitting side, designating the ACK or NAK signal as 1 bit signal. That is to say, when the receiving side transmits 1-bit ACK signal (for example, 1), the transmitting side regards the transmitted packet as having been properly received. However, when the receiving side transmits the NAK signal (for example, −1), the transmitting side concludes that the receiving side failed to receive a packet, so it retransmits the corresponding packet to the receiving side.

The HSDPA system described above made a regulation on the downlink data packet transmission of the Node B that user equipment should transmit 1-bit uplink response information (ACK/NAK) signal. In the radio communication system, the response information (ACK/NAK) signal the data receiving side transmits is designated in such manner that the data transmitting side can transmit the signal using high power and energy without any special protection like channel coding for faster interpretation. One example thereof is found in the HSDPA system, in which the user equipment transmits a 1-bit response information (ACK/NAK) signal that did not go through the channel coding to the uplink, and informs whether a corresponding data packet is successfully received or not.

FIG. 2 is a flow chart illustrating a conventional ARQ system. As shown in the drawing, in the case where packet data is received from the transmitting side (S111), the receiving side demodulates/decodes the packet data (S114). The receiving side then conducts a cyclic redundancy check (CRC) on the packet data, and confirms whether there is an error in the data (S117 and S120). When it turns out that there is no error generated, the receiving side generates an ACK signal and transmits the signal to the transmitting side (S123). In contrast, if there is an error in the data, the receiving side generates a negative acknowledgment (NAK) signal and transmits the signal to the transmitting side (S126). More specifically, the ACK signal or NAK signal is a response signal indicating the presence of an error in the data. Usually, +1 (ACK signal) or −1 (NAK signal) is mapped to be in correspondence to 1-bit information (0 or 1) and is transmitted to the transmitting side through an uplink. For example, the ACK signal +1 is mapped to 1, and the NAK signal −1 is mapped to 0, or vice versa. Therefore, such mapping relation should be preregulated.

The transmitting side discriminates whether the transmitted signal from the receiving side is the ACK signal (displayed as 1) or the NAK signal (displayed as 0), and sends the corresponding packet data to the signal back to the receiving side again. In case the information 0 is received from the receiving side, the transmitting side decides this as the NAK signal and retransmits (or returns) the same packet data. However, if the information 1 is received, it is regarded as the ACK signal, and the transmitting side transmits a new packet data to the receiving end.

To facilitate such communication between the transmitting side and the receiving side, binary information should be established to distinguish the ACK signal from the NAK signal. That is, when the receiving side sends the ACK signal, the information 1 is transmitted to the transmitting side, and at this time, binary information needs to be regulated to let the transmitting side recognize the information 1 as the ACK signal.

Also, in most radio packet transmission systems, the transmitting side and the receiving side operate on the basis that the response signal generation time is transmitted after a certain amount of time from the packet transmission time of the response object. When the transmitting side in the radio communication system transmits a packet, it naturally expects a response signal from the receiving side after a certain amount of time from the transmission time. Therefore, the packet transmitting side decides which signal, ACK or NAK, the response signal transmitted from the packet receiving side at the corresponding time belongs to, and performs the ARQ process thereon.

In summary, in the conventional ARQ system only the ACK signal or the NAK signal is transmitted to the transmitting side as the response signal associated with data transmission. While doing so, the transmitting side often has to transmit the data repeatedly to the receiving side because the situation of the channel from the receiving side to the transmitting side was not reflected on the signal. In addition, only 1 bit is assigned to transport the ACK signal or NAK signal in the conventional ARQ system, which means that even if the transmitting side managed to figure out the channel situation, there is no way to send this discovery to the transmitting side and let the channel situation be reflected on the signal

SUMMARY OF THE INVENTION

An object of the invention is to solve at least the above problems and/or disadvantages and to provide at least the advantages described hereinafter.

It is an object of the present invention to provide a method for controlling data transmission in a radio communication system using response signals which include control information that reflects received signal quality as well as response signals indicating whether the data transmission was successfully accomplished.

Another object of the present invention is to provide a method for composing response signals in general and response signals including additional control information.

To achieve the above object, there is provided a method for controlling data transmission in a radio communication system, in which a receiving side composes an response signal that is generated depending on the presence of an error in the packet data and reception quality, into multiplexed information, and transmits the information to a transmitting side. Here, the multiplexed information is a combination of 2 bits or greater.

According to the method for controlling data transmission in a radio communication system, if there is no error found in the packet data, the response signal is transmitted as an acknowledgment (ACK) signal, and this acknowledgment signal is the multiplexed information composed of continuous equivalent bit values.

However, if there is no error found in the packet data, the response signal is not transmitted as no reply, but it can be recognized as the acknowledgment signal by the transmitting side.

On the other hand, if the reception quality is good in spite of the error found in the packet data, the response signal is transmitted as a negative acknowledgment (NAK) signal, and this retransmission request signal is the multiplexed information composed of continuous equivalent bit values.

In case that the packet data happened to have an error in it, and the reception quality turned out to be very poor, the response signal is transmitted as a negative acknowledgment signal with additional control information (NAK with control) signal, and this NAK with control signal is the multiplexed information composed of non-continuous bit values. Preferably, the additional control information can be related to one of time delay, sending power, or multicode number.

Another aspect of the present invention provides a method for controlling data transmission in a radio communication system, the method including the steps of: figuring out reception quality if an error is generated in the packet data; and transmitting a negative acknowledgment (NAK) signal in accordance with a comparison result of the reception quality to a goal quality. Preferably, the retransmission request signal is multiplexed information composed of at least two bits.

Another aspect of the present invention provides a method for controlling data transmission in a radio communication system, the method including the steps of: examining whether packet data has an error; processing an acknowledgment signal as no reply if the packet data does not generate an error; comparing a reception quality with a goal quality if the packet data generates an error; and transmitting an negative acknowledgment (NAK) signal in accordance with a situation of the reception quality if the reception quality is less than the goal quality, while transmitting a NAK signal of the packet data if the reception quality is greater than the goal quality. Here, the reception quality means the signal to interference ratio.

In accordance with the method described above, the NAK signal depending on the situation of the reception quality is the multiplexed information composed of at least 2 bits, in which one of bits is used for displaying the retransmission request signal, and the others for displaying information on the situation of the reception quality in accordance with the combination.

Still another aspect of the present invention provides a method for controlling data transmission in a radio communication system, wherein, if no response signal is received from the receiving side for a certain amount of time, a transmitting side recognizes such as acknowledgment (ACK) or a negative acknowledgment (NAK) signal, but if response signals are received; the transmitting side recognizes one of the response signals as a NAK signal including information about the situation of a reception quality.

According to the method described above, when the response signals are received, at least one of the response signals can be regarded as the acknowledgment or the negative acknowledgment.

Still another preferred embodiment of the present invention provides a method for controlling data transmission in a radio communication system, the method including the steps of: processing an acknowledgment (ACK) signal as no reply if no error is found in packet data in result of an error examination conducted by a receiving side; deciding a degree of a reception quality if the packet data has an error in the receiving side; transmitting a negative acknowledgment (NAK) signal if the reception quality is in a good condition; transmitting a NAK signal including information on the situation of the reception quality if the reception quality turns out to be poor in the receiving side; and transmitting, at a transmitting side, the packet data reflecting each signal.

Preferably, the degree of the reception quality is determined through the comparison of the reception quality to the goal quality.

According to the method described above, in case the reception quality turns out to be very poor, the degree of the reception quality is fragmentized, and when a NAK signal is transmitted, the information on the situation of the reception quality corresponding to each degree can be added into the NAK signal before the signal is transmitted.

The method also tells that when each signal is composed of a plural bit, there can be signals as many as two to the plural bit power.

Also, according to the method above, in case the NAK signal including the information on the situation of the reception quality is received to the transmitting side, the packet data can be transmitted again in consideration with the situation of the reception quality.

Yet another preferred embodiment of the present invention provides a method for controlling data transmission in a radio communication system, the method including the steps of: transmitting an acknowledgment signal if no error is found in packet data in result of an error examination conducted by a receiving side; deciding a degree of a reception quality if the packet data has an error in the receiving side; processing a negative acknowledgment (NAK) signal as no reply if the reception quality is in a good condition; transmitting, at the receiving side, a negative acknowledgment (NAK) signal including information on the situation of the reception quality if the reception quality turns out to be poor; and transmitting, at a transmitting side, the packet data reflecting each signal.

Yet another preferred embodiment of the present invention provides a data retransmission feedback method, in which, if packet data has an error, a negative acknowledgment (NAK) signal transmitted in the form of multiplexed information in accordance with degree of the reception quality.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Embodiments of the present invention will be described herein below with reference to the accompanying drawings. In the following description, well-known functions or constructions are not described in detail since they would obscure the invention in unnecessary detail.

According to one embodiment of the present invention, signals from a receiving side to a transmitting side are divided into acknowledgment (ACK) signals, negative acknowledgment (NAK) signals, and NAK signals including additional control information that reflects the status of reception quality. Among these response signals, that is, ACK signal, NAK signal, and NAK signals including additional control information, particularly the ACK signals are not supposed to be forwarded to the transmitting side, and it should be understood that the transmitting side is able to recognize the signal forwarded as an ACK signal or NAK signal. Therefore, the two remaining signals, i.e., the NAK signal and the NAK signal including additional control information, are made to be in correspondence with +1 or −1 signals, and the additional control information reflecting the status of the reception quality is forwarded to the transmitting side, where the transmitting side, in response to the information, controls packet data and transmits the data, thereby improving the overall performance of the radio communication system.

As previously noted, a NAK-only system using the NAK signals can only be embodied without sending ACK signals. Of course, those skilled in the art can appreciate that it is also possible to embody an ACK-only system using the ACK signals only without sending NAK signals.

Figure 1:
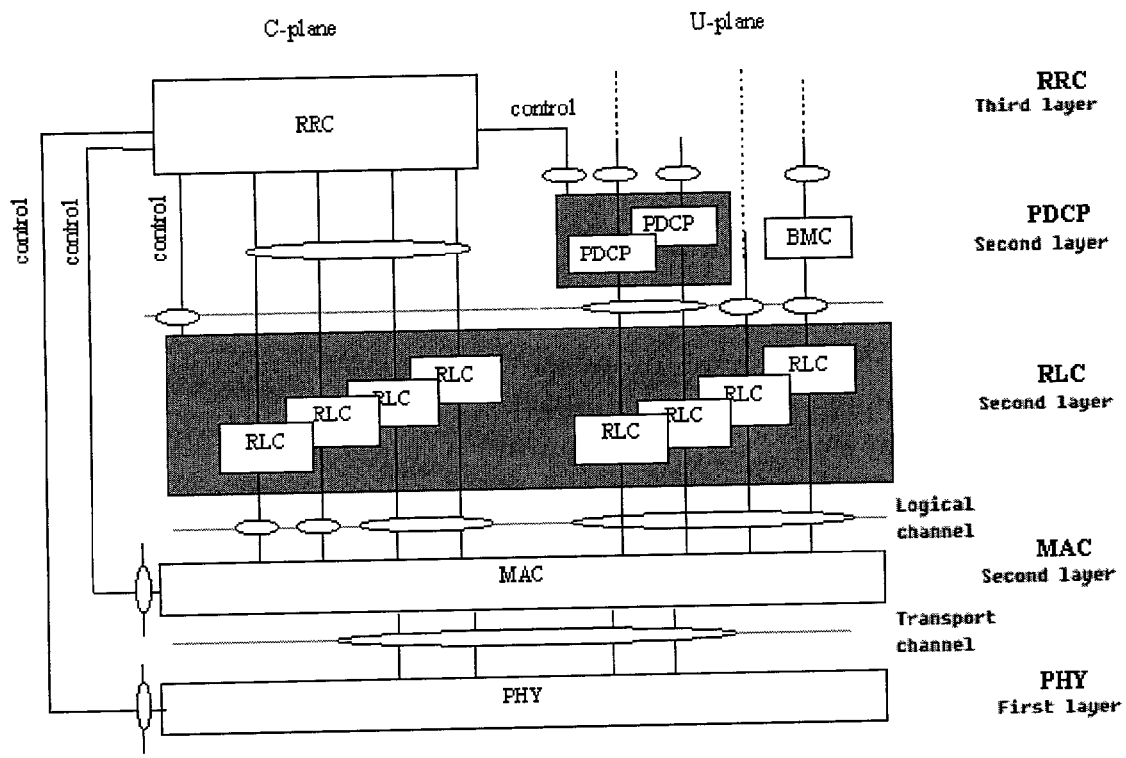
FIG. 1 is a diagram of a standard interface protocol over a 3GPP wireless access network for interfacing a terminal and a network wirelessly in the air.
Figures 2, 3:
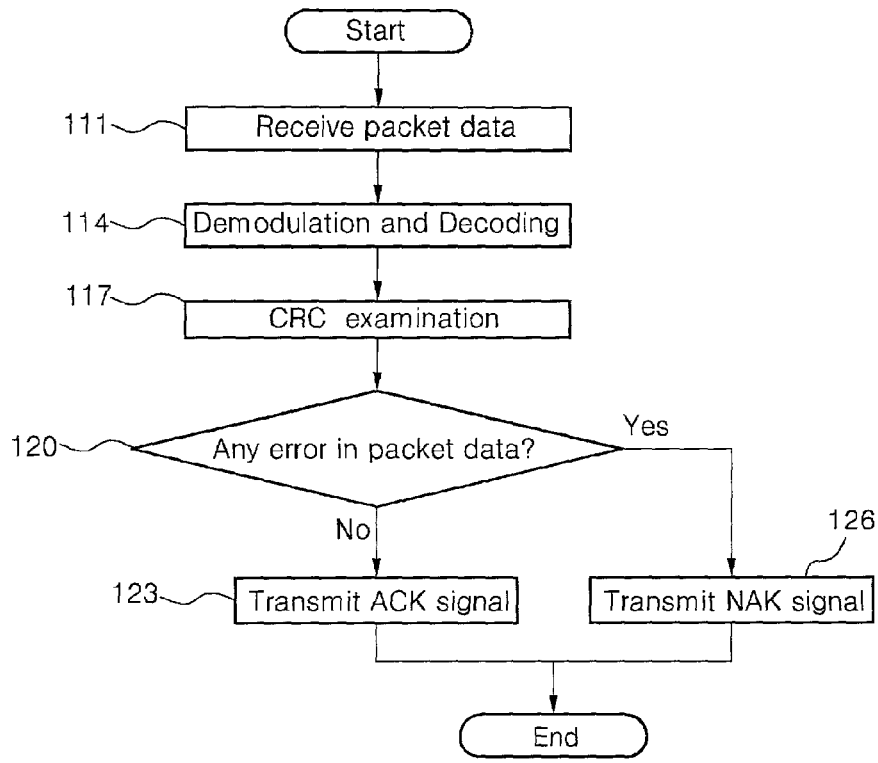
FIG. 2 is a flow chart which shows a conventional automatic repeat request (ARQ) system.
FIG. 3 is a diagram of response signals transmitted from a receiving side to a transmitting side of a communications system according to an embodiment of the present invention.

FIG. 3 is a diagram of response signals transmitted from a receiving side to a transmitting side according to an embodiment of the present invention. In conventional systems, as already explained, although it depends on whether there is an error in the received packet data, only ACK signals or NAK signals were transmitted to the transmitting side. On the other hand, according to the present invention as shown in FIG. 3, a NAK-only system or an ACK-only system can be embodied, which means that instead of sending one of ACK signals or NAK signals to the transmitting side, only the remaining signals are transmitted to the transmitting side. For example, in the NAK-only system using binary numerals greater than 2 bits, 1 bit can indicate the presence of the NAK signals, and the remaining bits can be used for displaying additional control information in accordance with the invention.

Figure 4:
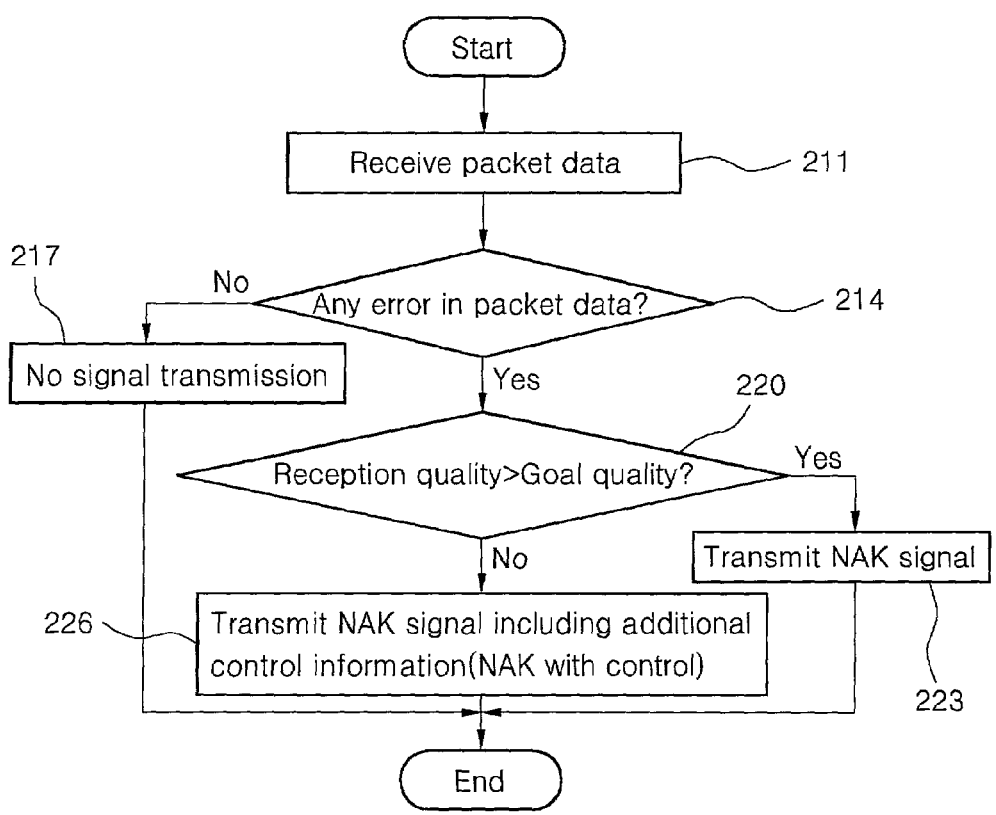
FIG. 4 is a flow chart showing steps included in a method for transmitting response signals from an ARQ system in a receiving side to a transmitting side according to an embodiment of the present invention.

FIG. 4 is a flow chart showing steps used by the present invention for sending response signals from an automatic repeat request (ARQ) system of a receiving side to a transmitting side according to the embodiment of the present invention presently being discussed. It should be noted here that even though the drawing depicted in FIG. 4 illustrates the NAK-only system only, the same method could be applied to the ACK-only or ACK/NAK systems to send response signals to the transmitting side.

Referring to FIG. 4, once packet data is received from the transmitting side (S211), the receiving side conducts a cyclic redundancy check (CRC) on the packet data, and then decides whether the packet data has any error (S214). If it turns out that the packet data has no error in it, the receiving side does not transmit any type of signal to the transmitting side (S217). Here, not sending any type of signal means that no matter how the receiving side ends up with having an error in the packet data, it is still regarded as the acknowledgment and no information about the error is going to be provided to the transmitting side separately. Of course, to do so, the receiving side and the transmitting side must be regulated to understand that not receiving the signal for a certain amount of time should be recognized by the transmitting side as the acknowledgment.

If there is an error in the packet data, the receiving side compares the reception quality to the goal quality (S220). Preferably, the reception quality is signal-to-interference ratio. That is to say, the receiving side measures the signal-to-interference ratio and compares it to the goal signal to interference ratio. If it turns out that the reception quality is greater than the goal quality, the receiving side decides that the reception quality is in a good condition, and transmits the NAK signal to the transmitting side (S223). On the contrary, if the reception quality is less than the goal quality, the receiving side decides that the reception quality is in a poor condition, and transmits the NAK signal including additional control information (NAK with control) (S226).

In the latter case, that is, if the reception quality is regarded as being poor, a variety of NAK signals with control information depending on the degree of the reception quality may be transferred to the transmitting side. The additional control information may include time delay, transmission power, or multicode number or any combination thereof. For instance, if the packet data that was retransmitted from the transmitting side is transmitted after a certain amount of time, mainly because of poor reception quality, additional control information about the command for delaying the time for a certain period is included in the NAK signal, and is forwarded to the transmitting side. As another example, if it is the case that the transmission power needs to be increased due to poor reception quality, additional control information about the command for increasing the transmission power is included in the NAK signal, and is forwarded to the transmitting side.

To enable the foregoing, the signals transmitted to the transmitting side in accordance with at least one embodiment of the present invention are preferably binary numerals of greater than 2 bits. So, if a response signal is transmitted to the transmitting side using 4-bit binary numerals, the first bit may, for example, be loaded with the information about the NAK, and the other 3 bits may include diverse additional control information. More specifically, if the binary numeral indicating the NAK is 1, then the other 3 bits can be used for diverse additional control information in total of $8(2^3)$. Therefore, if the 4-bit binary numeral is 1000, 1 of the first bit indicates the NAK signal, and the other 000 means that the retransmission time should be delayed for 3 seconds. In this manner, if the 3 bits are 001, the retransmission time will be delayed by 10 seconds. Similarly, 010 indicates the increase in the transmission power, 011 the decrease in the transmission power, 100 the increase in the multicode number, and 101 the decrease in the multicode number. It can therefore be seen that as the bit number indicating the additional control information gets higher, larger amounts of additional control information may be included.

Referring to FIG. 4, when each response signal (that is, ACK, NAK, and NAK with control) is transmitted, the transmitting side receives the response signal, and transmits corresponding packet data in response to the response signal. Of course, the ACK signal shall not be forwarded to the transmitting side since it is regarded as no reply. However, a regulation may be preset between the receiving side and the transmitting side that even when no ACK signal is received for a certain amount of time, the transmitting side will recognize this condition as the ACK signal.

Figure 5:
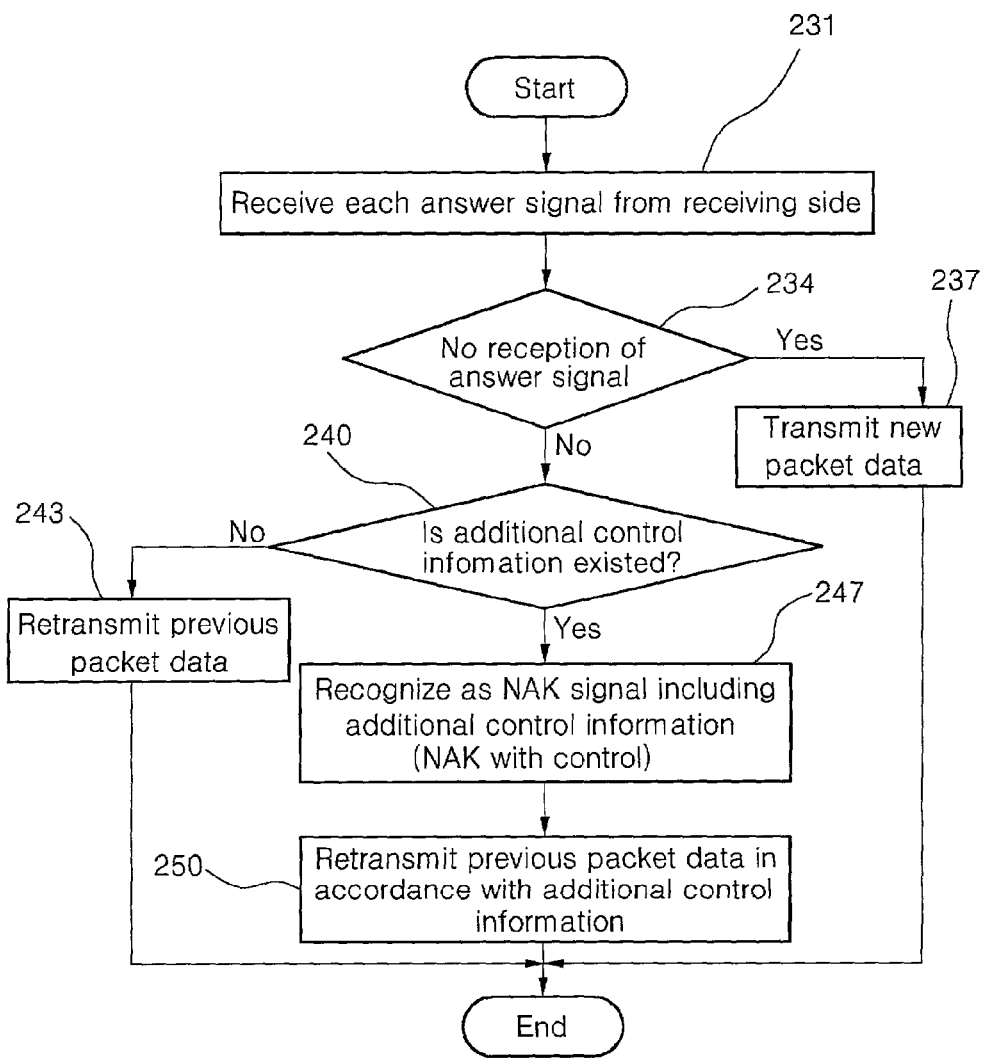
FIG. 5 is a flow chart which shows how an ARQ system of a transmitting side transmits packet data in response to a negative acknowledgment (NAK) according to an embodiment of the present invention.

FIG. 5 is a flow chart showing steps included in a method, implemented by the ARQ system of the transmitting side, for transmitting corresponding packet data in response to each response to the NAK only according to the preferred embodiment of the present invention. As depicted in the drawing, the transmitting side receives each response signal from the receiving side (S231). The transmitting side, having received a packet data from the receiving side, determines whether the response signal is duly received for a certain amount of time (S234). If the transmitting side transmitted a packet data to the receiving side, the response signal has to be received within the designated time. If no response signal is received, it is determined that the packet data is duly transmitted to the receiving side. If not, it is concluded that the packet data is lost for some reason. If this is the case, a different method may be tried to check the lost data.

Before getting into further details, an assumption may be made in connection with this embodiment of the present invention that when a packet data is transmitted from the transmitting side to the receiving side, the packet is always received to the transmitting side. In case the response signal is not received for a certain amount of time, the transmitting side regards this as the acknowledgment and transmits a new packet data to the receiving side (S237). If, on the other hand, the response signal is received within the designated time, the transmitting side regards the corresponding response signal as a NAK signal, and confirms whether additional control information is included in the response signals with greater than 2 bits except for the first bit (S240). If it turns out that the additional control information is not included in the corresponding response signal, the transmitting side simply regards this as a retransmission request, and transmits the previously transmitted packet data to the receiving side again (S243).

However, if the additional control information is included in the corresponding response signal, the transmitting side regards the response signal as a NAK signal including the additional control information (S247). Then, the transmitting side performs an analysis on the additional control information, takes a proper action thereon, and retransmits the previously transmitted packet data (S250). That is, as mentioned before, given that the additional control information means time delay, the previous packet data can be retransmitted after the designated time. Of course, if the additional control information involves transmission power or a multicode number, similar to the time delay, the transmission power or multicode number can be adjusted depending on the corresponding additional control information, and the previous packet data can be retransmitted.

Another method may be used which transmits response calls composed of multiplexed information, particularly by using multiple bits in accordance with each response call among other response signals composed of multiple bits, and more precisely more than 2 bits, the ACK signal, the NAK signal, and the NAK with control, which is explained with reference to FIG. 6.

Figure 6:
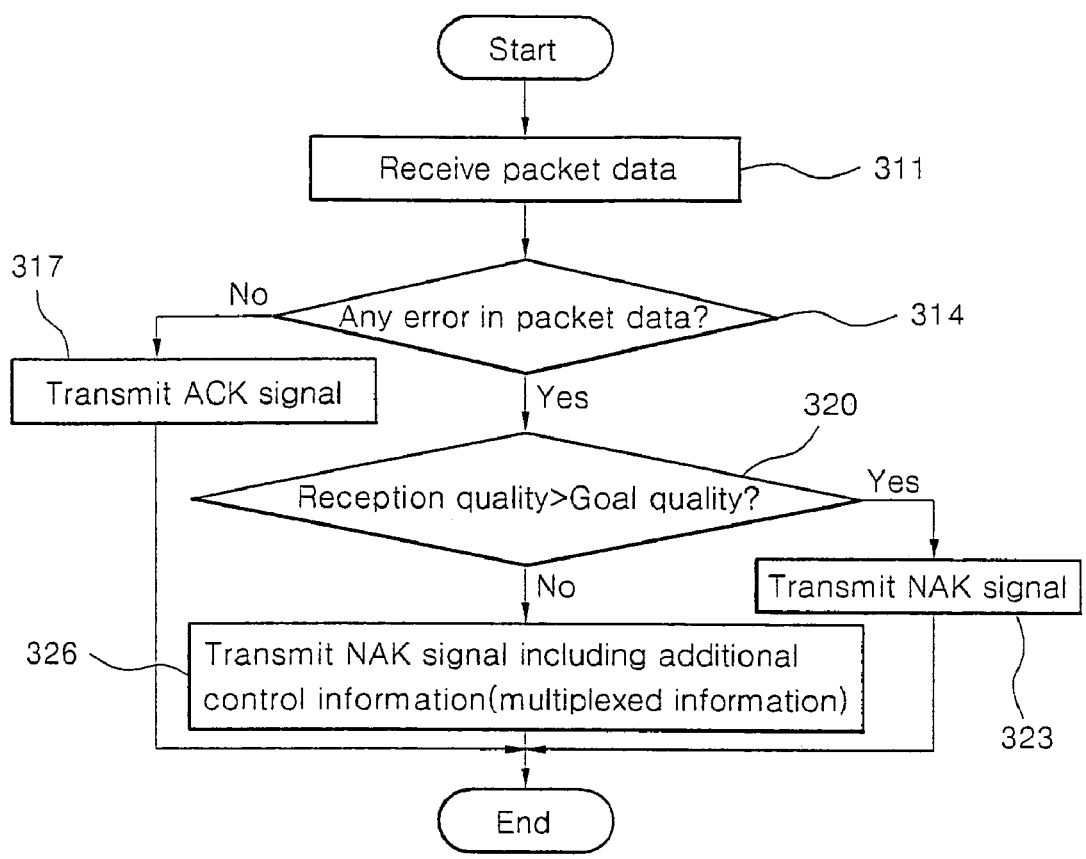
FIG. 6 is a flow chart which shows steps included in a method for transmitting a response signal from an ARQ system of a receiving side to a transmitting side of a communications system according to another embodiment of the present invention.

FIG. 6 is a flow chart showing steps included in a method for transmitting response calls from the ARQ system of the receiving side to the transmitting side according to another embodiment of the present invention. As shown, once the packet data is received to the receiving side (S311), the receiving side conducts the CRC examination on the packet data to find out if there is an error in the packet data (S314). If no error is found in the packet data, the ACK signal is transmitted (S317). If an error is found, the receiving side compares the reception quality to the goal quality (8320). Preferably, the reception quality, as previously mentioned, is noise-to-interference ratio.

If it turns out that the reception quality is greater than the goal quality, the NAK signal is transmitted (S323); but, if the reception quality is less than the goal quality, the NAK with control signal is transmitted (S326). Here, the reception quality being greater than the goal quality is understood to mean that the reception quality is in a good condition. On the contrary, a reception quality lower than the goal quality means that the reception quality is actually poor. One thing to be careful of here is that when the receiving side transmits the NAK with control signal, the NAK with control signal should preferably be composed of multiplexed information. For example, suppose that each response signal is an 8-bit binary numeral. Then, in the step 317, the ACK signal 11111111 could be transmitted, and in the step 323, the NAK signal 00000000 could be transmitted. As in this case, when the ACK signal or the NAK signal is involved, the signal to be transmitted has the same value continuously.

In contrast, if the NAK with control signal is transmitted, the continuously equal value is not the one that is transmitted. Instead, a specific value indicating the additional control information is transmitted. That is, a NAK with control signal including 01010101 and 00100100 could be transmitted. In this case, a special regulation can be made where 01010101 is designated as information about the increase in the transmission power, and 00100100 as the increase in the multicode number. The multiplexed information may include a large amount of additional control information. Therefore, there is no need to assign a separate channel to indicate the additional control information.

To compose such multiplexed information, an orthogonal signaling or amplitude modulation can be used. Also, as previously explained, one of a multiple number of bits may be used for indicating the ACK or the NAK, and the remaining bits could be used for multiplexed information for indicating the additional control information.

In conclusion, the present invention substantially improves ARQ performance by transmitting packet data that reflects the reception quality situation. If the reception quality is in poor condition, the additional control information indicating this condition is sent to the transmitting side, and the transmitting side, based on this additional control information, controls the reception quality and transmits the next packet data, thereby improving the transmission efficiency of the packet data. In addition, the response signals to be transmitted to the receiving side may include multiplexed information, such as additional control information which is diversified, and this diverse additional control information is transmitted to the transmitting side. Further, according to the present invention, through the NAK only system, in which the ACK signal is regarded as no reply, and only the NAK signal is forwarded to the transmitting side, a separate channel does not have to be assigned yet a lot of additional control information can be transmitted through an uplink.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for controlling transmission of data in a radio communication system comprising:
    generating a response signal which includes first information indicating whether an error is present in the data of a radio frame as received by a receiver and a second information indication of reception quality of the data of a radio frame, and
    transmitting the response signal from the receiver to a transmitter which transmitted the data, wherein, if the receiver determines the data has an error and the reception quality is in a poor condition, the response signal is transmitted as a negative acknowledgment (NAK) signal with additional control information indicative of time delay, sending power, or multicode number.

2. The method of claim 1, wherein, if the receiver determines that the data does not have an error, the response signal is not transmitted and is recognized as an acknowledgment signal by the transmitter.

3. The method of claim 1, wherein, if the receiver determines that the data has an error but the reception quality is in a good condition, the response signal is transmitted as a negative acknowledgment (NAK) signal.

4. The method of claim 1, wherein the NAK signal with the additional control information corresponds to multiplexed information which includes non-continuous bit values.

5. The method of claim 1, wherein the second information corresponds to the additional control information indicative of time delay, sending power, or multicode number.

6. A method for controlling transmission of data in a radio communication system, comprising:
  generating a response signal which includes first information indicating whether an error is present in the data of a radio frame as received by a receiver and a second information indication of reception quality of the data of a radio frame, and
  transmitting the response signal from the receiver to a transmitter which transmitted the data, wherein the second information is multiplexed information which is at least 2 bits in length.

7. The method of claim 6, wherein, if the receiver determines that the data has an error and the reception quality is in a poor condition, the response signal is transmitted as a negative acknowledgment (NAK) signal.

8. A method for controlling transmission of data in a radio communication system, comprising:
  generating a response signal which includes first information indicating whether an error is present in the data of a radio frame as received by a receiver and a second information indication of reception quality of the data of a radio frame, and
  transmitting the response signal from the receiver to a transmitter which transmitted the data, wherein, if the receiver determining the data does not have an error, the response signal is transmitted as an acknowledgment (ACK) signal.

9. The method of claim 8, wherein the acknowledgment (ACK) signal is multiplexed information which includes continuous equivalent bit values.

10. A method for controlling transmission of data in a radio communication system, comprising:
  generating a response signal which includes first information indicating whether an error is present in the data of a radio frame as received by a receiver and a second information indication of reception quality of the data of a radio frame, and
  transmitting the response signal from the receiver to a transmitter which transmitted the data, wherein, if the receiver determining the data has an error but the reception quality is in a good condition, the response signal is transmitted as a negative acknowledgment with additional control information signal.

11. A method for controlling transmission of data in a radio communication system, comprising:
  generating a response signal which includes first information indicating whether an error is present in the data of a radio frame as received by a receiver and a second information indication of reception quality of the data of a radio frame, and
  transmitting the response signal from the receiver to a transmitter which transmitted the data, wherein the radio frame is composed of three time slots.

12. A method for controlling data transmission in a radio communication system comprising:
  receiving packet data;
  if an error is determined to exist in the packet data, then determining reception quality of the packet data;
  comparing the reception quality with a predetermined reception quality; and
  transmitting a negative acknowledgment (NAK) signal in accordance with a result of the comparison, wherein the NAK signal includes multiplexed information at least 2 bits in length.

13. The method of claim 12, wherein, if the reception quality is determined to be greater than said predetermined quality, the NAK signal includes information associated with a request for retransmission of the packet data.

14. The method of claim 12, wherein, if the reception quality is determined to be greater than said predetermined quality, the NAK signal includes information associated with a request for retransmission of the packet data in accordance with the reception quality.

15. The method of claim 12, wherein, if the reception quality is less than said predetermined quality, the NAK signal includes information associated with a request for retransmission of a packet data.

16. A method for controlling data transmission in a radio communication system, comprising:
  receiving packet data;
  if an error is determined to exist in the packet data, then determining reception quality of the packet data;
  comparing the reception quality with a predetermined reception quality; and
  transmitting a negative acknowledgment (NAK) signal in accordance with a result of the comparison, wherein, if the reception quality is determined to be greater than said predetermined quality, the NAK signal includes information associated with a request for retransmission of the packet data, and wherein the information associated with a request for retransmission of the packet data is multiplexed information which includes continuous equivalent bit values.

17. A method for controlling data transmission in a radio communication system, comprising:
  receiving packet data;
  if an error is determined to exist in the packet data, then determining reception quality of the packet data;
  comparing the reception quality with a predetermined reception quality; and
  transmitting a negative acknowledgment (NAK) signal in accordance with a result of the comparison, wherein, if the reception quality is less than said predetermined quality, the NAK signal includes information associated with a request for retransmission of a packet data in accordance with the reception quality.

18. The method of claim 17, wherein the information associated with the request for retransmission of the packet data in accordance with the reception quality is multiplexed information which includes non-continuous bit values.

19. A method for controlling data transmission in a radio communication system comprising:
  determining whether received packet data has an error;
  processing an acknowledgment signal as no reply if the packet data does not have an error;

comparing a reception quality of the packet data with a predetermined reception quality if the packet data has an error; and transmitting a negative acknowledgment (NAK) signal with information indicating the reception quality, wherein the information indicating the reception quality indicates a time delay, transmission power, or a multicode number.

20. The method of claim 19, further comprising:

transmitting a negative acknowledgment (NAK) signal indicating that the reception quality is greater than said predetermined quality.

21. The method of claim 19, wherein the information indicating reception quality includes information indicative of a signal-to-interference ratio.

22. A method for controlling data transmission in a radio communication system, comprising:

determining whether received packet data has an error;

processing an acknowledgment signal as no reply if the packet data does not have an error;

comparing a reception quality of the packet data with a predetermined reception quality if the packet data has an error; and transmitting an negative acknowledgment (NAK) signal with information indicating the reception quality, wherein the information indicating the reception quality is multiplexed information which is at least 2 bits in length.

23. The method of claim 22, wherein one bit of the multiplexed information is used for displaying the retransmission request signal, and at least one remaining bit is used for displaying information indicating the reception quality in accordance with the combination.

24. A method for controlling data transmission in a radio communication system, comprising:

determining, in a transmitter, whether a receiver of packet data has transmitted a response signal;

if no response signal is received from the receiver for a certain amount of time, recognizing the failure to receive the response signal in the transmitter as one of an acknowledgment (ACK) and a negative acknowledgment (NAK) signal, but if the response signal is received, the transmitter recognizes the response signal as a NAK signal including information indicating a reception quality situation.

25. The method of claim 24, wherein another response signal received is recognized as an acknowledgment (ACK) signal or a negative acknowledgment (NAK) signal.

26. The method of claim 24, wherein the information indicating a reception quality is generated in case the reception quality at the receiver is in a poor condition.

27. The method of claim 24, wherein the information indicating reception quality contains a time delay, transmission power, or a multicode number.

28. A method for controlling data transmission in a radio communication system, comprising:

processing an acknowledgment signal (ACK) as no reply if no error is found in transmitted packet data received by a receiver;

determining a degree of a reception quality if the packet data is determined to have an error;

transmitting a negative acknowledgment (NAK) signal if the reception quality is in a good condition;

transmitting a NAK signal including information indicative of the reception quality if the reception quality is determined to be in a poor condition; and transmitting packet data reflecting each signal from the transmitter, wherein the information indicative of reception quality corresponds to a time delay, transmission power, or a multicode number.

29. The method of claim 28, wherein the degree of the reception quality is determined by comparing the reception quality to a predetermined quality.

30. The method of claim 28, wherein, if the transmitter does not receive any signal indicating the acknowledgment (ACK) is not received for a certain amount of time, the transmitter recognizes such as the ACK signal.

31. The method of claim 28, wherein, if the transmitter receives a signal indicating the negative acknowledgment (NAK), the packet data is retransmitted at the request for retransmission.

32. The method of claim 28, wherein, if the transmitter receives a negative acknowledgment signal including the information indicative of the reception quality, the packet data is retransmitted based on the reception quality.

33. A method for controlling data transmission in a radio communication system, comprising:

processing an acknowledgment signal (ACK) as no reply if no error is found in transmitted packet data received by a receiver;

determining a degree of a reception quality if the packet data is determined to have error;

transmitting a negative acknowledgment (NAK) signal if the reception quality is determined to be in a poor condition;

transmitting a NAK signal including information indicative of the reception quality if the reception quality is in a good condition; and transmitting packet data reflecting each signal at the transmitter, wherein the information indicative of reception quality corresponds to a time delay, transmission power, or a multicode number.

34. A method for controlling data transmission in a radio communication system, comprising:

processing an acknowledgment signal (ACK) as no reply if no error is found in transmitted packet data received by a receiver;

determining a degree of a reception quality if the packet data is determined to have an error;

transmitting a negative acknowledgment (NAK) signal if the reception quality is in a good condition;

transmitting a NAK signal including information indicative of the reception quality if the reception quality is determined to be in a poor condition; and transmitting packet data reflecting each signal from the transmitter, wherein, if the reception quality is in a poor condition, the degree of the reception quality is fragmentized, and information indicative of the reception quality corresponding to each degree is added to the NAK signal before the signal is transmitted.

35. A method for controlling data transmission in a radio communication system, comprising:

processing an acknowledgment signal (ACK) as no reply if no error is found in transmitted packet data received by a receiver;

determining a degree of a reception quality if the packet data is determined to have an error;

transmitting a negative acknowledgment (NAK) signal if the reception quality is in a good condition;

transmitting a NAK signal including information indicative of the reception quality if the reception quality is determined to be in a poor condition; and transmitting packet data reflecting each signal from the transmitter, wherein, if each signal includes plural bits, the signals are as many as two to the plural bit power.

36. The method of claim 35, wherein the plural bits are assigned such that some bits include information indicative of the reception quality and other bits include information about acknowledgment (ACK) or negative acknowledgment (NAK).

37. A method for controlling data transmission in a radio communication system, comprising:
   transmitting an acknowledgment (ACK) signal if no error is found in transmitted packet data received by a receiver;
   determining a degree of a reception quality if the packet data is determined to have an error;
   processing a negative acknowledgment (NAK) signal as no reply if the reception quality is in a good condition;
   transmitting, at the receiver, a negative acknowledgment (NAK) signal including information indicative of the reception quality if the reception quality is in a poor condition; and
   transmitting the packet data reflecting each signal at the transmitter, wherein the information indicative of reception quality corresponds to a time delay, transmission power, or a multicode number.

38. A data retransmission feedback method in a retransmission feedback system comprising:
   determining whether packet data received by a receiver has an error;
   if the packet data has an error, sending a negative acknowledgment (NAK) signal from the receiver to the transmitter which transmitted the packet data to request retransmission of the packet data, wherein the negative acknowledgment signal includes multiplexed information based on degree of a reception quality, and
   wherein, if the reception quality is in a poor condition, the NAK signal includes information indicative of the reception quality, said information indicating a time delay, transmission power, or a multicode number.

39. The method of claim 38, wherein, if the reception quality is in a good condition, the NAK signal includes information associated with a request for retransmission of the packet data.

40. The method of claim 38, wherein, the NAK signal is assigned as plural bits.

41. A terminal, comprising:
   means for sending or receiving information through a physical layer; and
   means for sending or receiving information though a protocol layer;
   wherein said means for sending or receiving information through the protocol layer carries information indicative of a reception quality of a transmitted signal, wherein, if the reception quality is in a poor condition, at least one of the means for sending or receiving information through the physical layer and means for sending or receiving information through the protocol layer sends or receives a NAK signal which includes information indicative of the reception quality, said information indicating a time delay, transmission power, or a multicode number.

* * * * *